United States Patent

Raiser

[15] 3,643,240

[45] Feb. 15, 1972

[54] LOCKING MEANS FOR DISK PACK ASSEMBLY

[72] Inventor: Wilhelm G. Raiser, Baden Wurttemberg, Germany

[73] Assignee: International Business Machines Corporation, Armonk, N.Y.

[22] Filed: May 27, 1970

[21] Appl. No.: 41,034

[52] U.S. Cl. ................340/174.1 C, 179/100.2 Z, 206/62 P, 346/74 MD

[51] Int. Cl. ....................................B65d 85/00, G11b 23/02

[58] Field of Search .....................179/100.2 Z; 340/174.1 C; 206/62; 346/74 MD

[56] References Cited

UNITED STATES PATENTS

| | | | |
|---|---|---|---|
| 3,487,390 | 12/1969 | Klinger et al. | 340/174.1 C |
| 3,465,875 | 9/1969 | McKelvey, Jr. | 340/174.1 C |
| 3,509,992 | 5/1970 | Dario et al. | 340/174.1 C |

*Primary Examiner*—Bernard Konick
*Assistant Examiner*—Vincent P. Canney
*Attorney*—Hanifin and Jancin and Nathan N. Kallman

[57] ABSTRACT

This invention teaches the combination in a magnetic disk storage file which comprises a disk pack assembly having a memory unit carrying rotatable locking means, a central support member, a plurality of magnetic disks and a first stationary engageable locking means; a dust cover enclosing the top and outer surfaces of the memory and including engaging means for engaging the first engageable locking means of the memory unit; a rotatable drive spindle for holding the disk pack assembly thereon, including second engageable means for locking the spindle to prevent rotary motion thereof; a rotatable handle coupled through the cover to the rotatable locking means; an actuatable spindle locking means for selectively engaging the second engageable means of the rotary drive spindle; and actuating means responsive to the dust cover when the disk pack assembly is positioned on the rotary spindle for actuating the spindle locking means to engage the second engageable means.

19 Claims, 7 Drawing Figures

PATENTED FEB 15 1972

3,643,240

SHEET 1 OF 2

*INVENTOR.*
WILHELM RAISER

*BY Nathan N. Kallman*
ATTORNEY

LOCKING MEANS FOR DISK PACK ASSEMBLY

BACKGROUND OF THE INVENTION

1. Field of the Invention

This invention is directed toward a combination in a magnetic disk storage file comprising a disk pack assembly having a memory unit carrying a rotatable locking means, a dust cover, a rotatable drive spindle, and first locking means cooperating between the memory and the dust cover for holding the cover stationary during the rotation of the rotatable locking means, and second locking means associated with the rotary spindle being actuated by means responsive to the dust cover when the disk pack assembly is positioned on the rotary spindle to prevent the spindle from rotating during the rotation of the rotatable locking means while locking the memory unit to the spindle and removing the dust cover from the disk pack assembly.

2. Description of the Prior Art

Presently, high-speed computers require high-speed transfer of information utilizing magnetic disk storage files having disk-type memory units. The present disk pack assembly has a memory unit which is attached to a dust cover by a rotatable locking means. The dust cover mates with a bottom cover, when the assembly is not placed on a rotary drive spindle in the magnetic disk storage file, to prevent contaminants or particles from alighting on the disks of the memory. The dust cover is integrally formed with a nonmoveable handle spanning its top surface. To lock the memory to the spindle of the storage file, the handle, and therefore the entire dust cover, is rotated thereby to cause the dust cover to rotate and lock the rotatable locking means to the spindle. During rotation the axis of the dust cover may be displaced with respect to the spindle or a force may be exerted on cover surface so as to cause an eccentricity or a temporary deformation in the cover walls. This deformation causes undesirable results since the inner surface of the dust cover is brought into frictional contact with the oxide on the outer periphery of the magnetic disks of the memory unit causing contaminating particles to be generated. Contaminants may also be generated if the outer surface of the cover contacts the shroud portion of the storage file. These particles cause a loss of information when they fall on the surface of the disks as they interfere with the desired magnetic relationship between the appropriate reading and writing apparatus and the information-containing tracks of the disk.

An object of this invention is to provide in a magnetic disk storage file the combination comprising a disk pack assembly having a memory unit carrying rotatable locking means, including a central support member and a plurality of magnetic disks concentrically disposed in a parallel, spaced-apart relation with respect to the support member and a first stationary engageable locking means; a dust cover having a top wall and an annular sidewall depending downwardly from the outer periphery of the top wall, the walls enclosing the top and the outer surfaces of the memory unit, and including engaging means for engaging the first engageable locking means of the memory unit; a rotatable drive spindle for holding the disk pack assembly thereon including the second engageable means for locking the spindle to prevent rotary motion thereof; the rotatable handle coupled through the cover to the rotatable locking means; the memory unit, being selectively locked to either the cover or the rotary spindle by the rotatable locking means; an actuatable spindle locking means for selectively engaging the second engageable means of the rotary drive spindle; and actuating means responsive to the dust cover when the disk pack assembly is positioned on the rotary spindle for actuating the spindle locking means to engage the second engageable means, whereby rotation of the rotatable handle unlocks the memory unit from the cover and locks the memory unit to the rotary spindle, the cover being held stationary by the first engageable locking means during the rotation of the handle, and whereby the rotary spindle is prevented from rotating during the rotation of the rotatable locking means while locking the memory unit to the spindle and removing the dust cover from the disk pack assembly.

Still another object is to provide a disk pack assembly for use in a magnetic disk storage file comprising a memory unit including a central support member and a plurality of magnetic disks concentrically disposed in a parallel, spaced-apart relation with respect to the support member; a stationary engageable locking means; a dust cover having a top wall and an annular sidewall depending downwardly from the outer periphery of the top wall, the walls enclosing the top and the outer surfaces of the memory unit, and including engaging means for engaging the engageable locking means of the memory unit; rotatable locking means carried by the support member for locking the memory unit selectively to either the cover or the associated rotary spindle; a rotatable handle coupled through the cover to the rotatable locking means, whereby rotation of the rotatable handle unlocks the memory unit from the cover and locks the memory unit to the associated rotary spindle, the cover being held stationary by the engageable locking means during the rotation of the handle.

In accordance with the preceding object, it is another object of the invention to provide a disk pack assembly as set forth wherein the engageable locking means comprises a notched retaining ring and wherein the engaging means comprises a member for engaging the notched ring.

Still another object in connection with the foregoing objects is to provide a disk pack assembly as set forth wherein the member is downwardly depending from the bottom surface of the top wall of the dust cover, is conically shaped and wherein the notched ring has a plurality of circumferentially spaced openings.

Still another object in connection with the foregoing objects is to provide a disk pack assembly of the type set forth wherein the engaging means includes a plurality of downwardly depending members.

Another object is to provide a disk pack assembly comprising a memory unit and a dust cover for use in a magnetic disk storage file having a rotary drive spindle wherein the memory unit is selectively locked to either the dust cover or the drive spindle, the improvement comprising engageable locking means associated with the memory unit and engaging means for engaging the engageable locking means, thereby to prevent the cover from moving during the selective locking of the memory unit.

In accordance with the preceding object, it is another object to provide an improved disk pack assembly as set forth and further comprising a handle, rotatable relative to the associated cover, the handle having a grasping portion disposed above the cover and a bottom portion coupled to the memory unit, whereby rotation of the handle causes the memory unit to become unlocked from the cover and to become locked to the drive spindle.

Still another object in connection with the foregoing objects is to provide a disk pack assembly wherein the engaging means are included in the memory unit as an upwardly extending member, or members, and wherein the stationary engageable locking means for receiving the engaging means of the memory unit are included as a portion of the dust cover.

A further object is to provide a magnetic disk storage file for receiving a disk pack assembly having a memory unit, a removable cylindrical dust cover, and rotatable locking means for selectively locking the memory unit to either the dust cover or the magnetic storage file, the combination comprising a rotary drive spindle for holding the disk pack assembly thereon, including means for engaging the rotatable locking means for locking the memory unit thereto and engageable means for locking the spindle to prevent rotary motion thereof during the locking of the memory unit to the spindle; actuatable spindle locking means for selectively engaging the engageable means of the rotary drive spindle to prevent rotary motion thereof; and actuating means responsive to the presence of the dust cover when the disk pack assembly is positioned on the drive spindle for actuating the spindle locking means to engage the engageable means, thereby to prevent the rotary drive spindle from rotating during the rotation of the rotatable locking means by locking the memory unit to the spindle and removing the dust cover from the disk pack assembly.

Further objects of the invention pertain to the particular arrangement of the parts of the disk pack assembly and of the magnetic disk storage file and the several components thereof whereby the above-outlined and additional operating features thereof are attained.

The invention both as to its organization and method of operation, together with further objects and advantages thereof, will best be understood with reference to the following specification taken in connection with the accompanying drawing.

SUMMARY OF THE INVENTION

Figure 1:
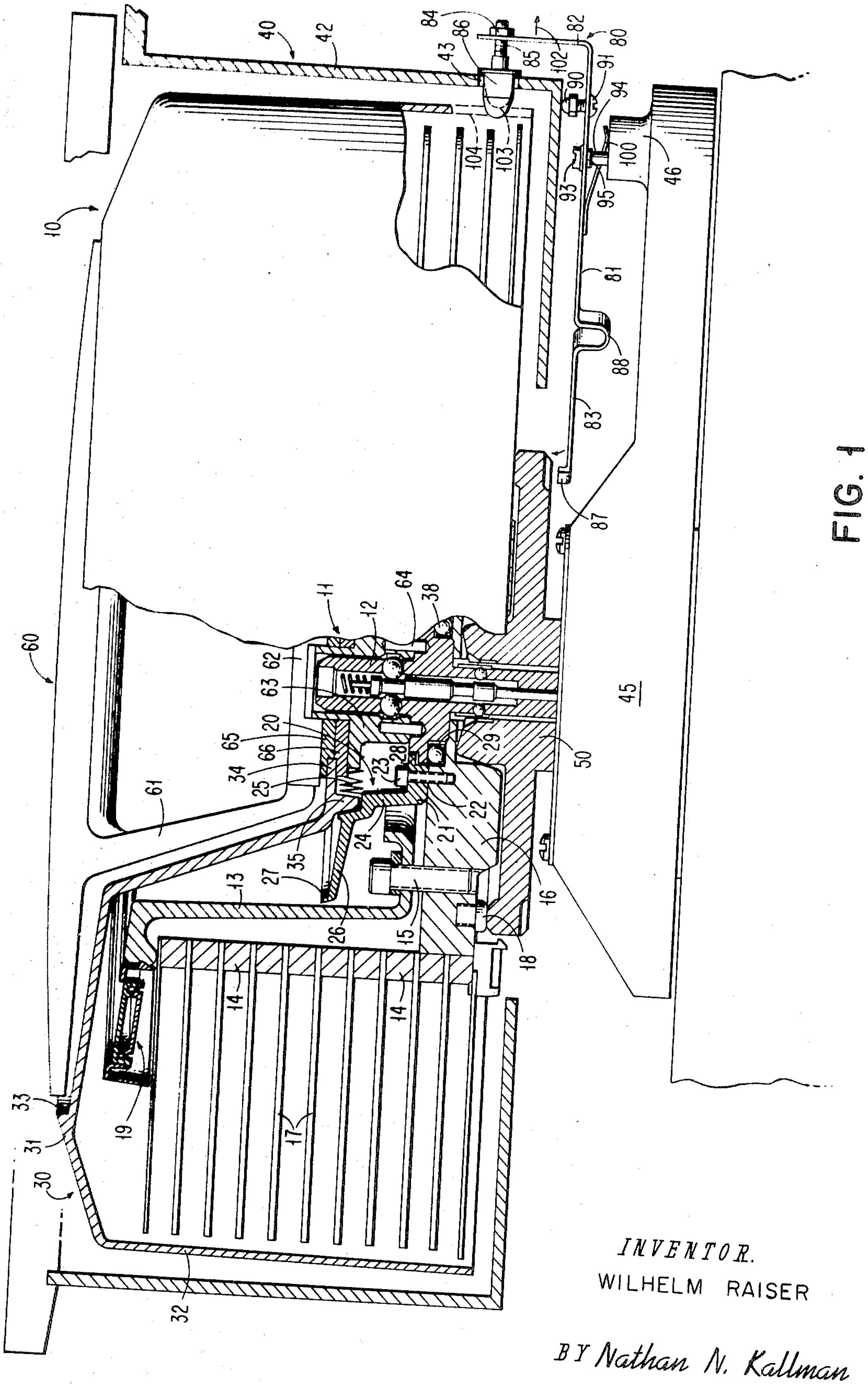
FIG. 1 is an elevational section view of the disk pack assembly in a magnetic disk storage file.

Referring to FIG. 1 of the drawings, a disk pack assembly 10 is illustrated as being mounted in a magnetic disk storage file 40. The storage file 40 includes, as a portion of its frame, a file base 45 having a centrally disposed drive means or spindle 50 rotatably mounted thereon.

The disk pack assembly 10 includes a memory unit 11 and a removable dust cover 30. The memory unit 11 carries a rotatable locking means, or body lock screw 12, and includes a central support member, or hub 16, and a plurality of magnetic disks 17 concentrically disposed in a parallel, spaced-apart relation with respect to the hub. The magnetic disks are separated by annular spacer rings 14, the disk 17 and the spacer rings 14 being clamped firmly to the hub 16 by a bell clamp 13. The bell clamp 13 has six openings through its base portion whereby it is secured to the hub 16 by six screws 15, the screws 15 being threaded through the openings in the clamp and into threaded aligned openings in the top surface of the hub 16. A generally annularly shaped plastic label retainer 19 abuts the top surface of the top disk 17 and the metal clamp 13 and includes an opening whereby labels particularly identifying each disk pack assembly may be inserted therein. The bottom surface of hub 16 contains three feet 18 positioned as to be vertically aligned with a corresponding continuous surface of the spindle 50, whereby to hold the memory unit 11 thereon in a precise alignment along the axis of the spindle.

The body lock screw 12 includes an externally threaded sleeve which extends below the bottom surface of the central portion of the hub 16 and an upwardly extending stud portion which extends above the top surface of the hub and within the cylindrical flange portion of the tool handle 63. The body lock screw 12 is rotatably mounted by annular race 29 and ball bearings 38 in the center of the hub 16, being received within a central cylindrical recess internally of the tool handle 63 of the handle 60, and held in place by a shoulder 28 of a retaining ring 20. The externally threaded bottom portion comprises a means for locking the disk pack assembly to the spindle 50 and/or locking the memory unit 11 to the dust cover 30 in which it is carried when moved from disk file to disk file or when placed in storage. This body lock screw apparatus is described in detail in U.S. Pat. No. 3,176,281, R. E. Pattison, "Portable Memory for Data Processing Machine," issued Mar. 30, 1965, and assigned in common with the present invention. The locking mechanism per se forms no part of the present invention and therefore will not be further described. Reiterating, the memory unit 11 is selectively locked to either the dust cover 30 or the spindle 50, whereby the disks 17 are protected from exposure to contaminants by the cover 30 unless the unit 11 is in operating position on a spindle 50.

Figure 2:
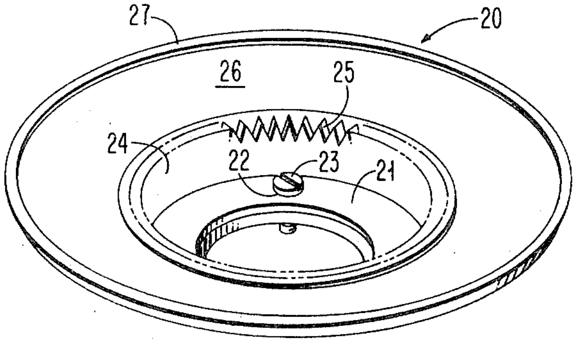
FIG. 2 is a perspective view of the retaining ring for engaging the dust cover.

Secured to the top of the hub 16 is a retaining ring 20 for cooperating with the dust cover 30 so as to prevent the cover from rotating during the locking or unlocking of the memory unit 11 to the spindle 50 or the cover 30. The features incorporated within the retaining ring 20 provide one facet of this inventive locking means for a disk pack assembly. As illustrated in FIG. 2, the retaining ring 20 is an integral object preferably formed from a plastic material. The ring 20 comprises an annular base 21 having four equally spaced openings 22 therethrough for inserting screws 23, whereby to secure the ring to the top surface of the hub 16. Extending angularly upwardly and outwardly from the outer periphery of the space 21 is a sidewall 24. The top of the sidewall presents a saw tooth appearance and has a plurality of alternating teeth and notches 25 circumferentially therearound. A top wall 26 extends outwardly from the outer surface of the sidewall 24, thereby to define a three-walled, notched enclosure to more completely restrain movement of a mating tooth 35 of the dust cover when it is inserted within the notch 25. The outer edge of the top wall 26, proximate to the inner surface of the bell clamp 13, has a lip 27 peripherally therearound so as to give the retaining ring 20 a generally saucer shape. The top wall 26 hides the top surface of the hub 16 thereby to hide the screws 15 and recesses so as to present a better appearance when looking down towards the center of the pack.

The dust cover 30 is a unitary plastic structure, which may particularly be formed by injection molding and includes a top wall 31 and an annular sidewall 32 depending downwardly from the outer periphery of the top wall 31. The top wall 31 has provided therein a recess 33 spaced outwardly from the outer edges of a handle 60 for receiving a bottom cover of a disk pack seated thereon so as to better enable several disk packs to be vertically stacked.

Integral with the top wall 31 of the dust cover 30 is a handle 60 which is rotatable relative to the dust cover. The handle 60 includes a ring-shaped grasping portion 61, the lower horizontal member of which is molded into a thin cylindrical plate 62. The plate 62 has a top surface which is flush with the lower horizontal member of the handle 61 and has a cylindrical recess within its under side whereby the top portion of the tool handle 63 is securely fitted therein, such as by bonding or by screws inserted through the two pieces. In addition, the tool handle 63 has a bore axially therethrough for receiving the stud portion of lock screw 12 and has three wrench pins 64 projecting downwardly below its lower surface which are adapted to be received within recesses in the base of the body lock screw 12 for coupling torque from the rotation of the handle 60 to lock the memory unit to the spindle. An inner central portion 34 of the dust cover 30 is maintained in a juxtaposed position between the plate 62 and the tool handle 63 of the handle 60 by two nylon slip washers 65 and 66, enabling the handle to be rotated relative to the dust cover. The slip washers 65 and 66 are axially aligned and have an inner annular surface which abuts the outer surface of the tool handle 63. Depending downwardly from the top surface of the inner central portion 34 of the dust cover 30 is a conical, tooth-shaped member 35 which is radially aligned for engaging one of the notches 25 of the retaining ring 20, thereby to lockingly maintain the dust cover 30 stationary during the rotation of the handle.

Referring again to FIG. 1 of the drawings, the disk pack assembly 10 is illustrated as being mounted in the magnetic disk storage file 40. The frame of the storage file 40 includes a file base 45 having a centrally disposed drive means, or spindle, 50 with a mounting portion 46 disposed at one end thereof. A metal shroud 42 disposed around the spindle 50 defines a generally cylindrical recess therein for receiving a disk pack assembly. Magnetic heads (not shown) are disposed outside the shroud 42 and upon electrical actuation are moved within the shroud for magnetically cooperating with the magnetic disks 17 of the disk pack assembly 10. The shroud 42 has a circular opening 43 therethrough disposed above the base 45 radially upwardly of the mounting portion 46. The drive spindle 50 is described in detail in pending U.S. Pat. application, Ser. No. 816,746, filed by Richard J. Charlton, and titled "-Centering and Holding Apparatus," assigned in common with the present invention. The spindle has a generally circular plan view and includes an upwardly raised central portion having a bore therethrough with means for locking the body lock screw 12 of the memory unit 11 thereto. In accordance with this invention, the bottom surface of the drive spindle 50 is machined so as to include a plurality of recessed retaining notches 70. The retaining notches are semicircular in the plan view, having the closed arc thereof at the innermost position and opening outwardly to the periphery of the spindle. However, a separate ring having notches therethrough may be secured to the bottom surface of the spindle 50 without changing the substance of this invention.

Figure 5:
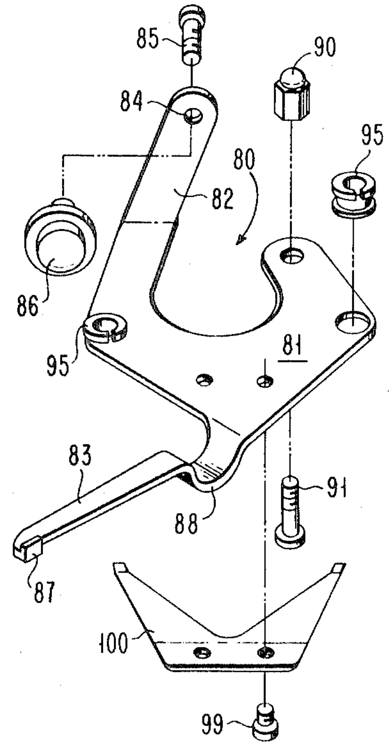
FIG. 5 is an exploded perspective view of the spindle locking means.

In accordance with this invention, a spindle locking means 80 is illustrated in FIGS. 1 and 5 to prevent the spindle from turning during the mounting and removing of the disk pack from the spindle. The spindle locking means 80 comprises a horseshoe-shaped base 81 having integral therewith at its outer extremity and upwardly extending portion 82 having an opening 84 near its upper edge. A screw 85 having its shank inwardly positioned is inserted through opening 84 and a button actuator 86 threaded thereon. Actuator 86 extends through opening 43 in shroud 42 so as to be actuated by the disk pack cover just prior to its engagement with spindle 50. Portion 83 includes a hook portion 87 at its innermost edge and a U-shaped flexure 88 at its junction with base 81. The spindle locking means 80 is pivotally mounted to the base mounting portions 46 by two shoulder screws 93 with their respective shanks 94 having resilient nylon bushings 95 loosely fitted therearound securing the top and bottom surfaces of base 81, as illustrated in FIG. 5, thereby to provide a floating type of suspension system wherein the spindle locking means pivots around the shoulder screws. The spindle locking means 80 is maintained biased in an unlocked position by a resilient steel spring 100, having one end thereof secured by screw 99 to the base mounting portion 46 and having the two legs at the other end thereof in contact with the bottom of base 81. In this unlocked position, the button actuator 86 is maintained at its maximum inward position within the shroud opening 43.

In operation, as the disk pack assembly is inserted within the shroud and moved downwardly towards the spindle 50, the sidewalls of the dust cover 32 (shown as dotted lines 104) contact the button actuator 86, thereby to cause the spindle locking means 80 to move outwardly in the direction of arrow 102 about the pivot points or axis defined by the shanks 94 of shoulder screws 93. When this occurs the initial biasing force of spring 100 is overcome and the hook portion 87 of the spindle locking means 80 engages the semicircular notch 70 on the underside of the spindle 50. In this locked position the spindle is prevented from rotating.

As shown by the dotted line 103, when the disk pack is positioned on the spindle 50 the tip of the button actuator 86 abuts the sidewall 32 of the dust cover 30. In the case that the hook 87 is not aligned with a notch 70, the top surface of the hook 87 contacts the underside of the spindle 50; but, due to the floating suspension system, the base 81 does not pivot about the screws 93. However, as soon as the spindle 50 is turned, the hook will fall into the next notch, thereby to engage the spindle and to prevent rotation thereof. The inertia created by the rotation of the spindle is absorbed by the flexure portion 88, thereby to prevent the inertia from being directly applied to the locking means 80.

In accordance with the second locking feature of this invention, the dust cover is held stationary by the engagement of tooth 35 in notches 25 of retaining ring 20 while the disk pack is locked to the spindle.

The single conically shaped member 35 described previously as the engaging member, along with the threaded bottom portion of the body lock screw 12 provides a two-axis support during the locking of the memory unit 11 to the spindle 50. Since the cover is held stationary with respect to the memory unit, there is no particle generation caused by a frictional rubbing of the inner surface of the walls 32 against the magnetically coated disks 17. These contaminants have caused dropouts when they alighted on the disk surface. Since the handle 60 is independently rotatable with respect to the dust cover 30, a resulting benefit of this invention is that the disk pack assembly is lockingly interchanged to the spindle by merely rotating the handle, the torque caused thereby being coupled through the wrench pins 64 of the tool handle to the rotatable lock screw. As long as the dust cover is affixed to the memory unit 11, the tooth 35-notch 25 engagement locks the dust cover to the memory unit 11. During the pack change, the spindle 50, as previously recited, is kept stationary by the spindle locking means 80.

Figure 3:
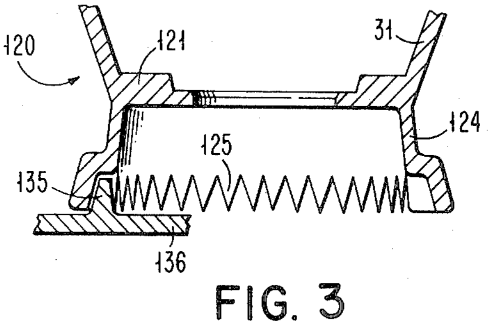
FIG. 3 is a sectional view of a second embodiment of the invention.
Figure 4:
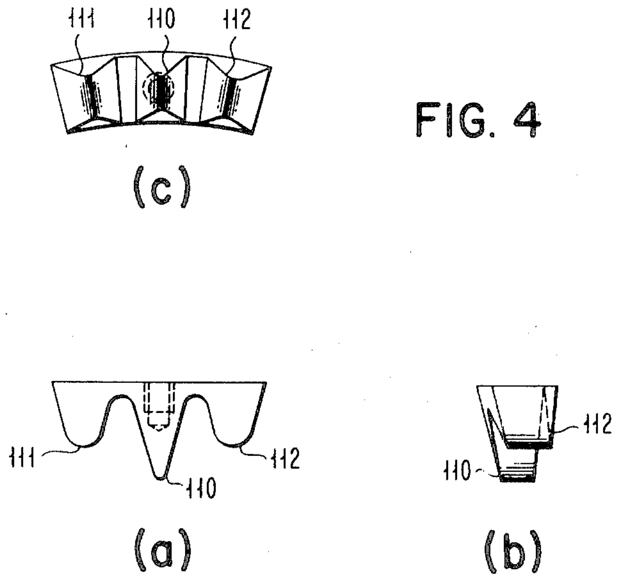
FIGS. 4A, B and C are, respectively, front elevation, side elevation and plan views of the engaging means of the invention.

A second alternate embodiment is shown in FIG. 3. As illustrated, the retaining ring 120 having a base 121 depending horizontally from the top wall 31 of a dust cover has outwardly extending sidewalls 124 having notches 125 therearound. In this embodiment the upwardly extending, conically shaped member 135 is affixed to a plate 136 that is secured to the top surface of the hub 16, thereby to maintain the dust cover 30 stationary during the locking of the memory unit to the spindle. In an alternative engaging member embodiment, as illustrated in FIG. 4, three engaging members are provided. The engaging means comprise a conically shaped, downwardly depending central member 110 and two, truncated, conically shaped members 111 and 112 circumferentially adjacent to the member 110. In this embodiment, the three members, 110, 111, and 112 cooperate in locking engagement with three vertically aligned notches in notch ring 20 so as to more securely maintain the cover in a nonrotatable relation with respect to the memory unit.

The invention as described includes locking means which prevent rotary motion of the drive spindle when locking a memory unit to the spindle and also locking means for maintaining the cover stationary while the memory unit is locked to the spindle so as to decrease the possibility of creating contaminating particles within the sensitive shroud area.

The disk pack cover lock is highly reliable since the locking mechanism has no moving parts and decreases the generation of contaminating particles by minimizing frictional contact. In addition, the retaining ring improves the appearance of the disk pack. The spindle locking assembly described herein is simple, functional since it is only activated when a memory unit is screwed on or taken from the spindle, and reliable since the activation occurs only if the spindle/memory unit has stopped rotating. Thus, the frictional forces between the spindle and the disk pack are minimized during locking; and safety is enhanced since the spindle is prevented from rotating if the disk pack memory has not been secured thereto or if the cover has not been removed from the memory before starting the drive.

While there has been described what are, at present, considered to be the preferred embodiments of the invention, it will be understood that various modifications may be made therein, and it is intended to cover in the appended claims all such modifications as fall within the true spirit and scope of the invention.

What is claimed is:

1. In a magnetic disk storage file, the combination comprising:

a disk pack assembly having a memory unit carrying rotatable locking means and including a central support member and a plurality of magnetic disks concentrically disposed in a parallel, spaced-apart relation with respect to said support member and a first stationary engageable locking means;

a dust cover having a top wall and an annular sidewall depending downwardly from the outer surfaces of said memory unit, and including engaging means for engaging said first engageable locking means of said memory unit;

a rotatable drive spindle for holding said disk pack assembly thereof including second engageable means for locking said spindle to prevent rotary motion thereof;

a rotatable handle coupled through said cover to said rotatable locking means;

said memory unit being selectively locked to either said cover or said rotary spindle by said rotatable locking means;

an actuatable spindle locking means for selectively engaging said second engageable means of said rotary drive spindle; and actuating means responsive to said dust cover when said disk pack assembly is positioned on said rotary spindle for actuating said spindle locking means to engage said second engageable means;

whereby rotation of said rotatable handle unlocks said memory unit from said cover and locks said memory unit to said rotary spindle, said cover being held stationary by said first engageable locking means during the rotation of said handle; and whereby said rotary spindle is prevented from rotating during the rotation of said rotatable locking means while locking said memory unit to said spindle and removing said dust cover from said disk pack assembly.

2. A disk pack assembly for use in a magnetic disk storage file having a rotary drive spindle, comprising:

a memory unit including a central support member and a plurality of magnetic disks concentrically disposed in a parallel spaced-apart relation with respect to said support member, and a stationary engageable locking means;

a dust cover having a top wall and an annular sidewall depending downwardly from the outer periphery of said top wall, said walls enclosing the top and the outer surfaces of said memory unit, and including engaging means for engaging said engageable locking means of said memory unit, rotatable locking means carried by said support member for locking said memory unit selectively to either said cover or the associated rotary spindle;

a rotatable handle coupled through said cover to said rotatable locking means;

whereby rotation of said rotatable handle unlocks said memory unit from said cover and locks said memory unit to the associated rotary spindle, said cover being held stationary by said engageable locking means during the rotation of said handle.

3. The disk pack assembly set forth in claim 2, wherein said engageable locking means and said rotatable locking means provide a two-point support during the locking of said memory to the associated spindle.

4. The disk pack assembly set forth in claim 2, wherein said engaging means is disposed on the bottom surface of the top wall of said dust cover and includes a plurality of downwardly depending members and said engageable locking means comprises a notched ring having a plurality of circumferentially spaced openings for receiving each of said members.

5. The disk pack assembly set forth in claim 2, wherein said engaging means comprises a conically shaped, downwardly depending member and two truncated conically shaped members circumferentially adjacent to said conical member and wherein said engageable locking means comprises a notched retaining ring having a plurality of circumferentially spaced openings for receiving each of said members.

6. The disk pack assembly set forth in claim 2, wherein said engageable locking means comprises a notched retaining ring, and wherein said engaging means comprises a member for engaging said notched ring.

7. The disk pack assembly set forth in claim 6, wherein said member is downwardly depending and conically shaped and said notched ring has a plurality of circumferentially spaced openings.

8. A disk pack assembly for use in a magnetic disk storage file having a rotary drive spindle, comprising:

a memory unit including a plurality of concentrically aligned disks;

a cylindrically shaped cover having an open end for providing a close fit circumferentially about said memory unit;

first locking means affixed to said memory unit;

engaging means attached to an inner surface of said cylindrical cover for engaging said first locking means;

second locking means coupled to said memory unit for locking said memory unit either to said cover or to the associated rotary drive spindle; and a rotatable handle coupled through said cover to said second locking means, said handle being rotatable relative to said cover, whereby rotation of said handle causes said memory unit to be selectively unlocked from said cover and locked to the associated rotary drive spindle, and whereby said first locking means holds said cover substantially stationary during rotation of said rotatable handle.

9. A disk pack assembly for use in a magnetic disk storage file having a rotary drive spindle, comprising:

a memory unit including a central support member and a plurality of magnetic disks concentrically disposed in a parallel spaced-apart relation with respect to said support member, and engaging means;

a dust cover having a top wall and an annular sidewall depending downwardly from the outer periphery of said top wall, said walls enclosing the top and the outer surfaces of said memory unit, and including a stationary engageable locking means for receiving said engaging means of said memory unit, rotatable locking means carried by said support member for locking said memory unit selectively to either said cover or the associated rotary spindle;

a rotatable handle coupled through said cover to said rotatable locking means;

whereby rotation of said rotatable handle unlocks said memory unit from said cover and locks said memory unit to the associated rotary spindle, said cover being held stationary by said engaging means during the rotation of said handle.

10. The disk pack assembly set forth in claim 9, wherein said engageable locking means comprises a notched retaining ring, and wherein said engaging means comprises a member for engaging said notched ring.

11. The disk assembly set forth in claim 9, wherein said engaging means is carried by the top surface of said support member and includes a plurality of upwardly extending members and wherein said engageable locking means is disposed on the bottom surface of the top wall of said dust cover and comprises a notched ring having a plurality of circumferential spaced openings for receiving each of said members.

12. In a magnetic disk storage file for receiving a disk pack assembly including a memory unit and a removable cylindrical dust cover and rotatable locking means for selectively locking the memory unit to either the dust cover or the magnetic storage file, the combination comprising:

a rotary drive spindle for holding the disk pack assembly thereon including means for engaging the rotatable locking means for locking the memory unit thereto and engageable means for locking said spindle to prevent rotary motion thereof during the locking of the memory unit to the spindle;

actuatable spindle locking means for selectively engaging said engageable means of said rotary drive spindle to prevent rotary motion thereof; and actuating means responsive to the presence of the dust cover when said disk pack assembly is positioned on said drive spindle for actuating said spindle locking means to engage said engageable means;

thereby to prevent said rotary drive spindle from rotating during the rotation of said rotatable locking means while locking the memory unit to said spindle and removing the dust cover from the disk pack assembly.

13. In a magnetic disk storage file for receiving a disk pack assembly having a memory unit and a removable cylindrical dust cover and rotatable locking means for selectively locking the memory unit to either the dust cover or the magnetic storage file, the combination comprising:

a rotary drive spindle for holding the disk pack assembly thereon including means for engaging the rotatable locking means for locking the memory unit thereto and engageable means for locking said spindle to prevent rotary motion thereof during the locking of the memory unit to the spindle;

a shroud formed with a cylindrical wall having an inner diameter slightly greater than the diameter of the dust cover, said shroud wall having an opening;

a file base;

spindle locking means including a button portion extending through said shroud opening and a hook portion for selectively engaging said engageable means of said rotary drive spindle to prevent rotary motion thereof, and an arm portion interconnecting said button portion and said hook portion and secured to said file, said spindle locking means movable between a normal unlocked position and a locked position, and means for biasing said spindle locking means in said unlocked position;

whereby in said normal unlocked position said button portion of said spindle locking means extends radially inwardly so that the cover of the disk pack assembly, when received within said shroud, engages said button portion of said spindle locking means, thereby to unbias said biasing means and to move said spindle locking means into said locked position, and whereby in said locked position said button portion abuts the outer surface of the dust cover and said hook portion of said spindle locking means lockingly engages said engageable means of said rotary drive spindle;

thereby to prevent said rotary drive spindle from rotating during the rotation of said rotatable locking means while locking the memory unit to said spindle and removing the dust cover from the disk pack assembly.

14. The combination set forth in claim 13, wherein said engageable means of said rotary drive spindle includes a notched retaining ring having a plurality of notches circumferentially therearound.

15. The combination set forth in claim 13, and further comprising adjusting means for accurately positioning said hook portion of said spindle locking means with respect to said shroud.

16. The combination set forth in claim 13, wherein said biasing means is a flexure spring.

17. The combination set forth in claim 16, wherein said flexure spring has two legs for providing stability to the positioning of said spindle locking means.

18. In a disk pack assembly comprising a memory unit and a dust cover for use in a magnetic disk storage file having a rotary drive spindle, wherein said memory unit is selectively locked to either the dust cover or the drive spindle, the improvement comprising:

engageable locking means associated with said memory unit:

engaging means for engaging said engageable locking means, thereby to prevent the cover from moving during the selective locking of the memory unit; and a handle rotatable relative to the associated cover, said handle having a grasping portion disposed above the cover and a bottom portion coupled to the memory unit, whereby rotation of said handle causes said memory unit to become unlocked from the cover and to become locked to said drive spindle.

19. In a disk pack assembly comprising a memory unit and a dust cover for use in a magnetic disk storage file having a rotary drive spindle, wherein said memory unit is selectively locked to either the dust cover or the drive spindle, the improvement comprising:

engageable locking means associated with said memory unit;

engaging means for engaging said engageable locking means, thereby to prevent the cover from moving during the selective locking of the memory unit; and two axially aligned, contacting slip washers disposed within the associated cover and surrounding the handle for allowing said handle to rotate relative to said cover.

* * * * *